(12) United States Patent
Gemba et al.

(10) Patent No.: US 9,077,028 B2
(45) Date of Patent: Jul. 7, 2015

(54) GAS DIFFUSION LAYER FOR FUEL CELL, MANUFACTURING METHOD THEREOF, MEMBRANE ELECTRODE ASSEMBLY, AND FUEL CELL

(75) Inventors: Miho Gemba, Hyogo (JP); Yoichiro Tsuji, Osaka (JP); Masaki Yamauchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 370 days.

(21) Appl. No.: 13/393,617

(22) PCT Filed: Sep. 1, 2010

(86) PCT No.: PCT/JP2010/005382
§ 371 (c)(1),
(2), (4) Date: Mar. 1, 2012

(87) PCT Pub. No.: WO2011/027550
PCT Pub. Date: Mar. 10, 2011

(65) Prior Publication Data
US 2012/0164553 A1     Jun. 28, 2012

(30) Foreign Application Priority Data
Sep. 3, 2009   (JP) .................................. 2009-203432

(51) Int. Cl.
*H01M 4/86* (2006.01)
*H01M 8/00* (2006.01)
*H01M 8/04* (2006.01)
(Continued)

(52) U.S. Cl.
CPC ............ *H01M 8/241* (2013.01); *H01M 8/0239* (2013.01); *H01M 8/0243* (2013.01); *H01M 8/0245* (2013.01); *H01M 8/0258* (2013.01); *H01M 8/0273* (2013.01);
(Continued)

(58) Field of Classification Search
CPC ............ H01M 8/0239; H01M 8/0243; H01M 8/0245; H01M 8/0258; H01M 8/1002; H01M 8/241
See application file for complete search history.

(56) References Cited

U.S. PATENT DOCUMENTS 5,252,410 A   10/1993   Wilkinson et al.
5,998,057 A   12/1999   Koschany et al.
(Continued)

FOREIGN PATENT DOCUMENTS

CN    1202984    12/1998
EP    2 357 695   8/2011
(Continued)

OTHER PUBLICATIONS

Machine translation of Japanese Patent Publication No. 2007-172996 A, published Jul. 5, 2007.*
(Continued)

*Primary Examiner* — Carlos Barcena
*Assistant Examiner* — Lilia V Nedialkova
(74) *Attorney, Agent, or Firm* — Wenderoth, Lind & Ponack, L.L.P.

(57) ABSTRACT

Provided is a gas diffusion layer for a fuel cell, wherein a reactive gas passage groove for distributing a reactive gas is formed in one principal surface of the gas diffusion layer, and a reinforcing member is provided along the reactive gas passage grooves. Thus, the deformation of the gas diffusion layer due to a fastening pressure can be suppressed to improve the power generation performance.

13 Claims, 7 Drawing Sheets

(51) Int. Cl.
*H01M 8/10* (2006.01)
*H01M 8/24* (2006.01)
*H01M 8/02* (2006.01)

(52) U.S. Cl.
CPC .......... *H01M 8/1002* (2013.01); *Y02E 60/521* (2013.01); *H01M 2008/1095* (2013.01)

(56) References Cited

U.S. PATENT DOCUMENTS

| | | | |
|---|---|---|---|
| 6,183,898 | B1 | 2/2001 | Koschany et al. |
| 6,350,540 | B1* | 2/2002 | Sugita et al. .................. 429/505 |
| 2005/0181264 | A1 | 8/2005 | Gu et al. |
| 2007/0298290 | A1* | 12/2007 | Bekkedahl et al. ............. 429/13 |
| 2009/0029222 | A1 | 1/2009 | Bae et al. |
| 2010/0173220 | A1 | 7/2010 | Gemba et al. |

FOREIGN PATENT DOCUMENTS

| | | |
|---|---|---|
| JP | 8-507402 | 8/1996 |
| JP | 2000-513480 | 10/2000 |
| JP | 2001-076737 | 3/2001 |
| JP | 2004-152744 | 5/2004 |
| JP | 2006-286494 | 10/2006 |
| JP | 2006-302700 | 11/2006 |
| JP | 2006-310104 | 11/2006 |
| JP | 2006-339089 | 12/2006 |
| JP | 2007-157578 | 6/2007 |
| JP | 2007-172996 | 7/2007 |
| JP | 2007172996 A * | 7/2007 |
| JP | 2007-299654 | 11/2007 |
| JP | 2008-041348 | 2/2008 |
| JP | 2010-027331 | 2/2010 |
| WO | 94/09519 | 4/1994 |
| WO | 2008/152794 | 12/2008 |

OTHER PUBLICATIONS

International Search Report issued Dec. 7, 2010 in International (PCT) Application No. PCT/JP2010/005382.
International Preliminary Report on Patentability issued Apr. 19, 2012 in International (PCT) Application No. PCT/JP2010/005382, together with English translation thereof.
Chinese Office Action (OA) issued Dec. 23, 2013 in corresponding Chinese Patent Application No. 20108003884.1, together with English translation thereof.
Chinese Search Report (SR) issued Dec. 23, 2013 in corresponding Chinese Patent Application No. 20108003884.1, together with English translation thereof.
Extended European Search Report dated Jan. 9, 2015 issued in corresponding European Patent Application No. 10813501.3.

* cited by examiner

GAS DIFFUSION LAYER FOR FUEL CELL, MANUFACTURING METHOD THEREOF, MEMBRANE ELECTRODE ASSEMBLY, AND FUEL CELL

TECHNICAL FIELD

The present invention relates to a fuel cell, in which a liquid fuel such as pure hydrogen, methanol or the like, or reducing agent such as reformed hydrogen obtained from a fossil fuel, is used as a fuel gas, and air (oxygen) is used as an oxidant gas. In particular, the present invention relates to a gas diffusion layer included in a membrane electrode assembly used for use the fuel cell.

BACKGROUND ART

A fuel cell (for example, polymer electrolyte fuel cell) is a device in which a fuel gas containing hydrogen and an oxidant gas containing oxygen, such as air, are electrochemically reacted with each other so as to simultaneously generate power, heat, and water.

The fuel cell generally has a structure in which a plurality of cells are laminated, and these cells are pressurized and fastened by a fastening member such as a bolt or a band. Each cell is constituted by sandwiching a membrane-electrode-assembly (hereinafter, referred to as an MEA) by a pair of plate-shaped conductive separators.

The MEA includes a polymer electrolyte membrane, and a pair of electrode layers disposed on both surfaces of the polymer electrolyte membrane. One of the pair of electrode layers serves as an anode electrode, whereas the other thereof serves as a cathode electrode. Each of the paired electrode layers includes catalyst layers mainly containing carbon powder on which a metal catalyst is supported, and a gas diffusion layer that is a porous conductive layer to be disposed on the catalyst layers.

The fuel cell generally has a structure so that an electrochemical reaction is developed to generate electrical power and heat, when a fuel gas and an oxidant gas are respectively brought into contact with the anode electrode and the cathode electrode through reactive gas passage groove (fuel gas passage groove or oxidant gas passage groove) provided in the pair of separators.

In this field of fuel cells, various proposals have been made conventionally in order to achieve further higher power generation performance. As one of the proposals, there is a technique disclosed in Patent Document 1 (Japanese Unexamined Patent Publication No. 2007-157578). This Patent Document 1 discloses a reactive gas passage groove containing a first reactive gas passage provided in a gas diffusion layer and a second reactive gas passage groove provided in a separator. More specifically, the technique in Patent Document 1 is intended to provide not only the separator but also the gas diffusion layer with the reactive gas passage grooves, and combine the reactive gas passage grooves to configure a large-area reactive gas passage groove. According to this technique in Patent Document 1, the sufficiently large cross-sectional area of the reactive gas passage can be ensured to improve the power generation performance, and the volume of the separator molded can be reduced to improve the productivity of the separator.

PRIOR ART DOCUMENTS

Patent Documents

Patent Document 1: Japanese Unexamined Patent Publication No. 2007-157578

SUMMARY OF THE INVENTION

Subjects to be Solved by the Invention

However, the structure in Patent Document 1 has an issue of the gas diffusion layer deformed due to a fastening pressure applied when a pair of separators is attached to the MEA. More specifically, the gas diffusion layer comprises a porous member, and thus likely to be deformed due to a pressure essentially. When the gas diffusion layer is provided with the reactive gas passage grooves as in Patent Document 1, ribs for separating the reactive gas passage grooves adjacent to each other are particularly likely to be deformed. The deformation of the ribs will result in a reduction in the cross-sectional area of the reactive gas passage, and increase the pressure loss in the fuel cell. For this reason, the ability to supply the reactive gas sufficiently to each electrode will be lost, thereby resulting in an inability to achieve sufficient power generation performance.

Therefore, an object of the present invention is to solve the issue described above, and provide a gas diffusion layer for a fuel cell and a manufacturing method therefor, a membrane electrode assembly, as well as a fuel cell, which can suppress the deformation of the gas diffusion layer due to a fastening pressure to improve the power generation performance.

Means For Solving The Subject

In order to achieve the foregoing object, the present invention is provided with the following arrangement.

According to a first aspect of the present invention, there is provided a gas diffusion layer for fuel cell comprising: a reinforcing member provided along a reactive gas passage groove for distributing a reactive gas, the groove being formed in one principal surface of the gas diffusion layer.

As used herein "a reinforcing member provided along a reactive gas passage groove" refers to the fact that the reinforcing member is provided to follow at least a portion of the surface of the reactive gas passage groove. Preferably, the reinforcing member is provided on at least the bottom of the surface of the reactive gas passage groove. More preferably, the reinforcing member is provided on the bottom of the surface of the reactive gas passage groove, and on at least a portion of a pair of both side surfaces in contact with the bottom. Even more preferably, the reinforcing member is provided on the bottom and pair of both side surfaces of the surface of the reactive gas passage groove.

According to a second aspect of the present invention, there is provided the gas diffusion layer according to the first aspect, wherein the gas diffusion layer comprises ribs separating the reactive gas passage groove adjacent to each other, the reinforcing member reinforces the ribs, and the reinforcing member is provided along the respective reactive gas passage groove.

According to a third aspect of the present invention, there is provided the gas diffusion layer according to the first or second aspect, wherein the gas diffusion layer comprise a porous member mainly containing conductive particles and a polymer resin.

As used herein "a porous member mainly containing conductive particles and a polymer resin" refers to a porous member having a structure supported just by the conductive particles and the polymer resin, without use of carbon fibers as the base member (what is called a self-supporting structure). In a case where the porous member is manufactured with conductive particles and a polymer resin, as will be described later, a surfactant and a dispersing solvent are used, for example. In this case, while the surfactant and dispersing solvent are removed by calcining in the course of manufacturing steps, the surfactant and dispersing solvent may possibly fail to be removed, and remain in the porous member. Therefore, as long as the porous member has a self-support structure without use of any carbon fibers as a base member, the term means that the porous member may contain therein the surfactant and dispersing solvent remaining in that way. In addition, as long as the porous member has a self-support structure without use of any carbon fibers as a base member, the term also means that the porous member may contain therein other materials.

According to a fourth aspect of the present invention, there is provided the gas diffusion layer according to any one of the first to third aspects, wherein the reinforcing member is a sheet-like member comprising a plurality of openings for reactive gas distribution.

According to a fifth aspect of the present invention, there is provided the gas diffusion layer according to the fourth aspect, wherein the reinforcing member is a mesh sheet.

According to a sixth aspect of the present invention, there is provided the gas diffusion layer according to the fourth or fifth aspect, wherein the reinforcing member has a concavo-convex shape corresponding to the shape of the principal surface of the gas diffusion layer, and the reinforcing member is provided along the principal surface.

According to a seventh aspect of the present invention, there is provided the gas diffusion layer according to any one of the first to fifth aspects, wherein the reinforcing member is provided only on a surface of the reactive gas passage groove.

According to an eighth aspect of the present invention, there is provided a membrane electrode assembly comprising:
a polymer electrolyte membrane;
a pair of catalyst layers opposed to each other with the polymer electrolyte membrane interposed between the catalyst layers; and
a pair of gas diffusion layers opposed to each other with the polymer electrolyte membrane and the pair of catalyst layers interposed between the gas diffusion layers,
wherein at least one of the pair of gas diffusion layers is the gas diffusion layer for a fuel cell according to any one of the first to seventh aspects.

According to a ninth aspect of the present invention, there is provided a fuel cell comprising:
a polymer electrolyte membrane;
a pair of catalyst layers opposed to each other with the polymer electrolyte membrane interposed between the catalyst layers;
a pair of gas diffusion layers opposed to each other with the polymer electrolyte membrane and the pair of catalyst layers interposed between the gas diffusion layers; and
a pair of separators opposed to each other with the polymer electrolyte membrane, the pair of catalyst layers, and the gas diffusion layers interposed between the separators,
wherein at least one of the pair of gas diffusion layers is the gas diffusion layer for a fuel cell according to any one of the first to seventh aspects.

According to a 10th aspect of the present invention, there is provided a manufacturing method of a gas diffusion layer for fuel cell, the method comprising:
placing a reinforcing member and a sheet-like porous member between a mold and a press machine, the mold having a convex section corresponding to a shape of reactive gas passage groove; and
moving the press machine toward the mold to push the porous member and the mesh sheet against the mold, thereby forming the reactive gas passage groove in one principal surface of the porous member, and forming the reinforcing member along the reactive gas passage groove.

According to an 11th aspect of the present invention, there is provided the manufacturing method according to the 10th aspect, wherein a sheet-like member comprising a plurality of openings for reactive gas distribution is used as the reinforcing member.

According to a 12th aspect of the present invention, there is provided the manufacturing method according to the 10th aspect, wherein a mesh sheet is used as the reinforcing member.

According to a 13th aspect of the present invention, there is provided the manufacturing method according to the 12th aspect, wherein, when the mesh sheet is placed between the mold having the convex section and the press machine, the mesh sheet is placed so that each wire rod constituting the mesh sheet is oblique to a direction of extending the convex section.

According to a 14th aspect of the present invention, there is provided the manufacturing method according to any one of the 10th to 12th aspects, wherein before placing the reinforcing member between the mold having the convex section and the press machine, the reinforcing member is placed between the mold having the convex section and a mold having a concave section corresponding to the convex section, and the molds are coupled to form the reinforcing member in advance, so as to match a shape of the mold having the convex section.

According to a 15th aspect of the present invention, there is provided the manufacturing method according to the 14th aspect, wherein the mold having the convex section and the mold having the concave section are coupled with the use of a thermoplastic resin as a material for the reinforcing member, and with temperatures of the molds raised to a temperature of a glass transition temperature of the thermoplastic resin or more, thereby forming the reinforcing member in advance so as to match a shape of the mold having the convex section.

According to a 16th aspect of the present invention, there is provided the manufacturing method according to the 10th aspect, wherein a sheet-like member is used as the reinforcing member, the sheet-like member provided with a plurality of linear slits at intervals corresponding to an arrangement pitch of ribs, the ribs separating the reactive gas passage groove adjacent to each other.

Effect of the Invention

The gas diffusion layer for a fuel cell, membrane electrode assembly, as well as fuel cell are configured to have the reactive gas passage groove provided in one principal surface of the gas diffusion layer, and have the reinforcing member provided along the reactive gas passage groove, and thus can suppress the deformation of the gas diffusion layer due to a fastening pressure to improve the power generation performance. Thus, the decrease in the cross-sectional area of the passage in the gas diffusion layer can be suppressed to make it possible to improve the power generation performance.

BRIEF DESCRIPTION OF THE DRAWINGS

These and other aspects and features of the present invention will become clear from the following description taken in conjunction with the preferred embodiments thereof with the accompanying drawings, in which.

DETAILED DESCRIPTION OF THE INVENTION

In the following, with reference to the drawings, a description will be given of the embodiments of the present invention. It is noted that, throughout the drawings referred to in the following, identical reference symbols are allotted to the identical or corresponding components, and description thereof will not be repeated.

<<First Embodiment>>

Figure 1:
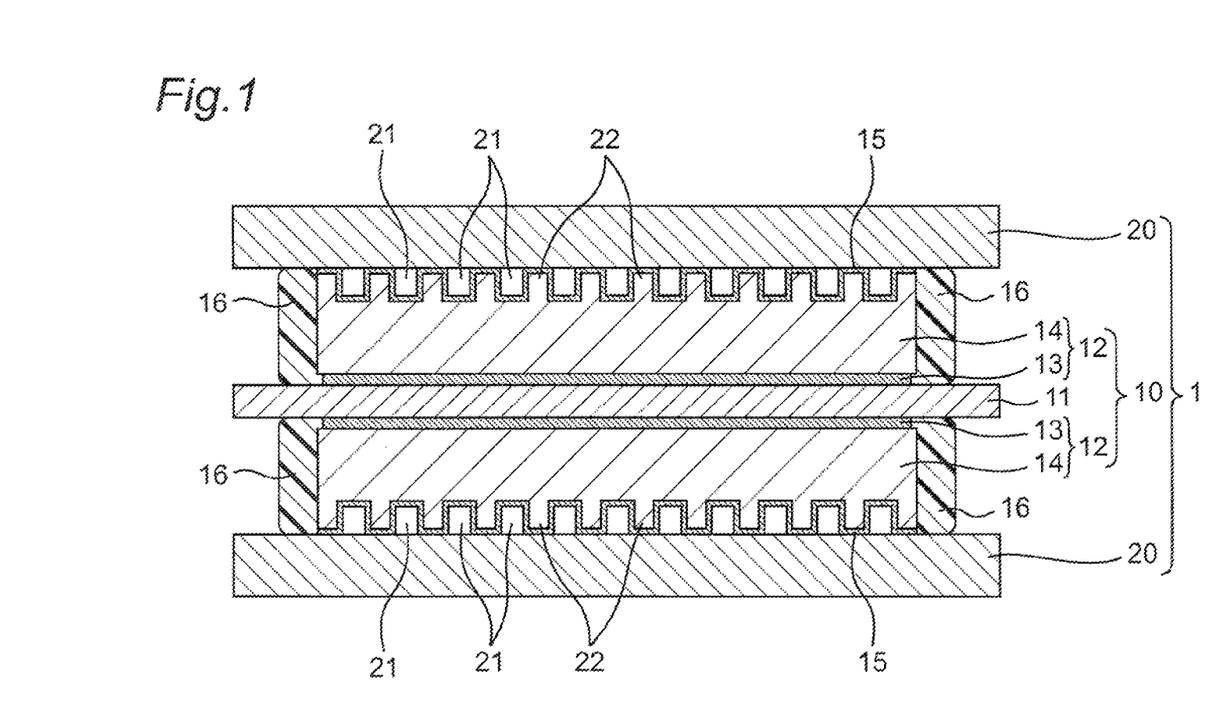
FIG. 1 is a cross-sectional view schematically illustrating the basic structure of a fuel cell according to a first embodiment of the present invention.

FIG. 1 is a cross-sectional view schematically illustrating the basic structure of a fuel cell according to a first embodiment of the present invention. The fuel cell according to the first embodiment is a polymer electrolyte fuel cell in which a fuel gas containing hydrogen and an oxidant gas containing oxygen, such as air, are electrochemically reacted which each other so as air simultaneously generate power, heat, and water.

The fuel cell according to the first embodiment includes, as shown in FIG. 1, a cell (electric cell) 1 which has a membrane-electrode-assembly 10 (hereinafter, referred to as an MEA), and a pair of plate-like conductive separators 20, 20 placed on both surfaces of the MEA 10. One of the pair of separators 20, 20 serves as an anode separator, whereas the other thereof serves as a cathode separator. The fuel cell according to the first embodiment may be configured by stacking more than one cell 1. In this case, the cells 1 stacked one another are preferably fastened by pressurization at a predetermined fastening pressure with a fastener member (not shown) such as a bolt, in order to prevent the leakage of the fuel gas and the oxidant gas, and reduce the contact resistance.

The MEA 10 has a polymer electrolyte membrane 11 for selectively transporting hydrogen ions, and a pair of electrode layers 12, 12 formed on both surfaces of the polymer electrolyte membrane 11. One of the pair of electrode layers 12, 12 serves as an anode electrode, whereas the other thereof serves as a cathode electrode.

The electrode layer 12 has a catalyst layer 13 formed on one surface of the polymer electrolyte membrane 11, which is configured to include a mixture of conductive particles supporting an electrocatalyst thereon with a hydrogen-ion conducting polymer electrolyte, and has a gas diffusion layer 14 formed on the catalyst layer 13, which has a current-collecting action, gas permeability, and water repellency.

The gas diffusion layer 14 has reactive gas passage grooves 21 provided in the principal surface adjacent to the separator 20. The reactive gas passage grooves 21 of the gas diffusion layer 14 on the anode side serve as fuel gas passage grooves, whereas the reactive gas passage grooves 21 of the gas diffusion layer 14 on the cathode side serve as oxidant gas passage grooves. When the fuel gas is supplied through the fuel gas passage grooves to the electrode layer 12 on the anode side, whereas the oxidant gas is supplied through the oxidant gas passage grooves to the electrode layer 12 on the cathode side, an electrochemical reaction is developed to generate electrical power and heat.

Figure 2:
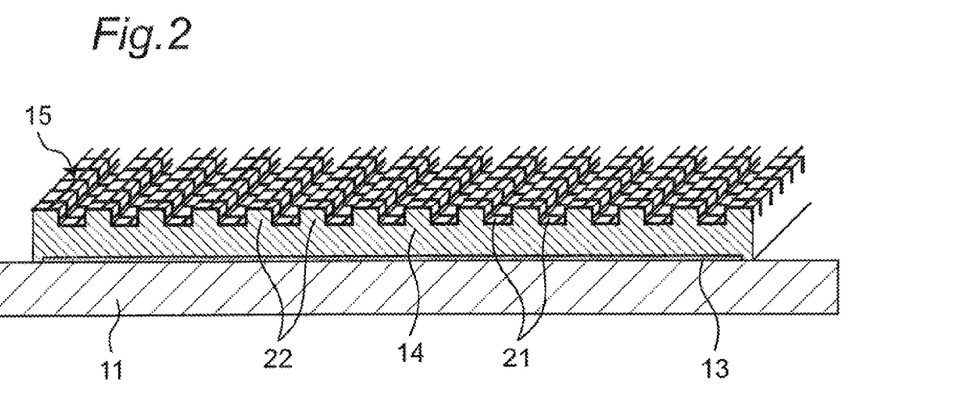
FIG. 2 is an enlarged perspective view illustrating a membrane-electrode assembly included in the fuel cell of FIG. 1, and a diagram illustrating a section of the membrane-electrode assembly in cross-section.
Figure 3:
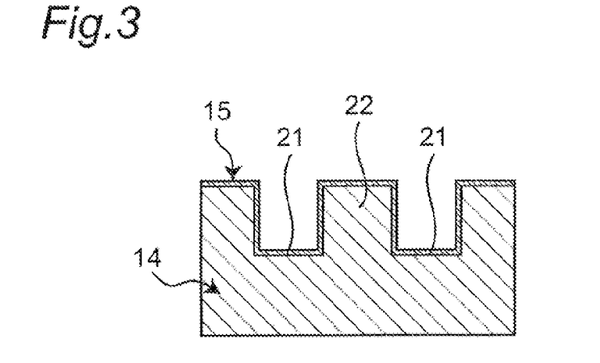
FIG. 3 is an enlarged cross-sectional view of a gas diffusion layer included in the fuel cell of FIG. 1.

In addition, the gas diffusion layer 14 is provided with, as shown in FIGS. 2 and 3, a mesh sheet 15 as an example of a reinforcing member along the principal surface on the separator 20 side. With this mesh sheet 15, ribs 22 between the reactive gas passage grooves 21, 21 adjacent to each other are reinforced so as not to be deformed by a fastening pressure applied when the cell 1 is assembled. The reinforcing member may be provided to follow at least a portion of the surface of the reactive gas passage grooves 21. Preferably, the reinforcing member is provided on at least the bottom of the surface of the reactive gas passage grooves 21. More preferably, the reinforcing member is provided on the bottom of the surface of the reactive gas passage grooves 21, and on at least a portion of a pair of both side surfaces in contact with the bottom. Even more preferably, the reinforcing member is provided on the bottom and pair of both side surfaces of the surface of the reactive gas passage grooves 21.

Figure 4:
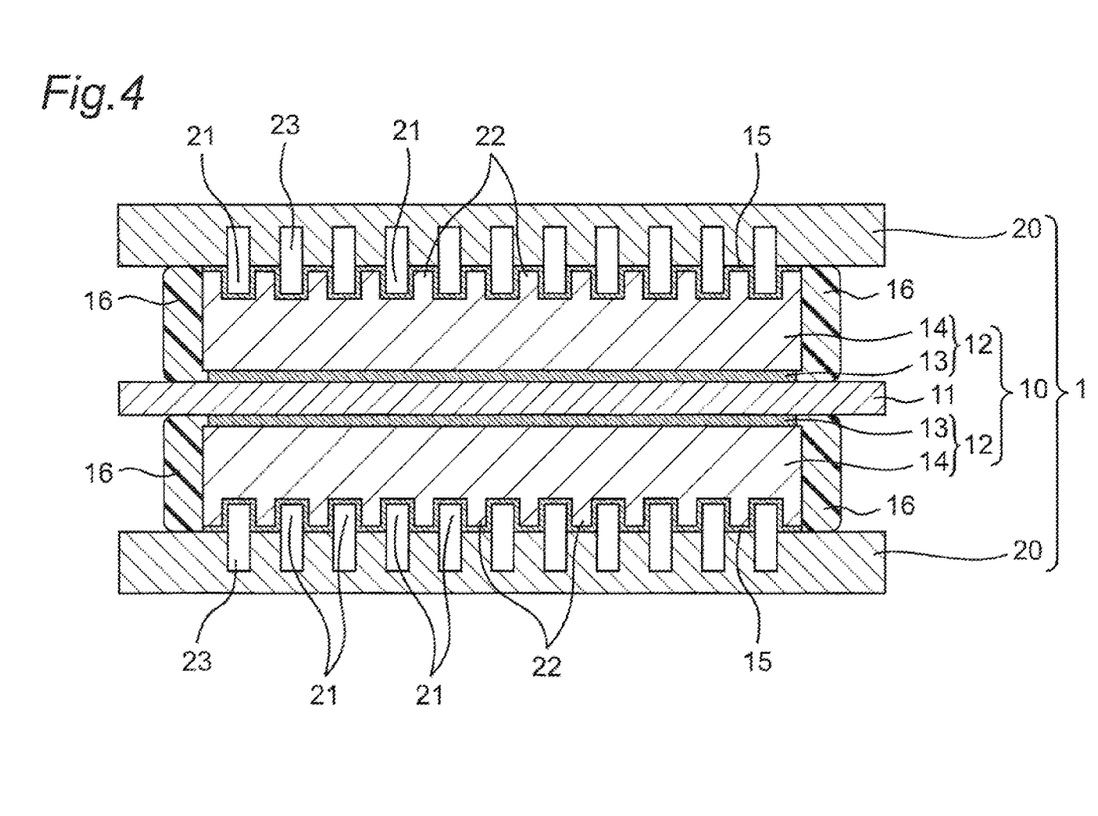
FIG. 4 is a cross-sectional view schematically illustrating a modification example of the fuel cell according to the first embodiment of the present invention.

Further, as shown in FIG. 4, reactive gas passage grooves 23 may be provided in positions corresponding to the reactive gas passage grooves 21 of the separator 20. More specifically, the reactive gas passage grooves 21 may be combined with the reactive gas passage grooves 23 to constitute large-area reactive gas passage grooves.

An annular gasket 16 is placed between the separator 20 and the polymer electrolyte membrane 11 so as to cover the side surfaces of the catalyst layer 13 and gas diffusion layer 14. This gasket 16 prevents the reactive gas from being leaked to the exterior, from being mixed with the other reactive gas.

Next, the structures, materials, and manufacturing methods will be described in further details for the polymer electrolyte membrane 11, the catalyst layers 13, the gas diffusion layers 14, the mesh sheets 15, the gaskets 16, and the separators 20.

First, the polymer electrolyte membrane 11 will be described.

The polymer electrolyte membrane 11 has an ion-exchange group for hydrogen ions to selectively achieve hydrogen ion permeation along the direction of the membrane thickness. Conventionally known membranes can be used as the polymer electrolyte membrane 11. For example, a polymer electrolyte membrane containing a perfluorocarbon sulfonic acid having a main chain containing —$CF_2$— and a side chain including a sulfonic acid group (—$SO_3H$) as a terminal functional group can be used as the polymer electrolyte membrane 11. Specifically, polymer electrolyte membranes sold under the brand names such as, for example, Nafion (registered trademark) from DuPont in the U.S., Flemion (registered trademark) from Asahi Glass Co., Ltd., and Aciplex (registered trademark) from Asahi Kasei Corporation can be used as the polymer electrolyte membrane 11. Further, the polymer electrolyte membrane 11 has a membrane thickness of, for example, 20 to 200 μm.

Next, the catalyst layers 13 will be described.

The catalyst layers 13 are configured to include a mixture of conductive particles supporting an electrocatalyst thereon with a hydrogen-ion conducting polymer electrolyte.

The electrocatalyst constituting the catalyst layers 13 is not to be considered particularly limited, and a variety of metal particles including noble metals can be used for the electrocatalyst. For example, one or more metals selected from the group consisting of platinum, gold, silver, ruthenium, rhodium, palladium, osmium, iridium, chromium, iron, titanium, manganese, cobalt, nickel, molybdenum, tungsten, aluminum, silicon, zinc, and tin can be used as the material of the metal particles. Among these metals, platinum is preferably used as the electrocatalyst. In addition, a platinum alloy which is an alloy of platinum and a platinum-group metal other than platinum may be used as the electrocatalyst. In this case, it is particularly preferable to use an alloy of platinum and ruthenium as the electrocatalyst constituting the catalyst layer 13 on the anode side. Thus, the activity of the catalyst layer 13 on the anode side can be stabilized.

In addition, the metal particles preferably have an average particle size of 1 to 30 nm. When the metal particles have an average particle size of 1 nm or more, the preparation is facilitated industrially. On the other hand, when the metal particles have an average particle size of 30 nm or less, the activity can be achieved sufficiently per mass of the electrocatalyst, and the cost increase of the fuel cell can be suppressed.

For example, a carbon powder (conductive carbon particles) can be used as the conductive particles constituting the catalyst layer 13. The carbon powder preferably has a specific surface area of 50 to 1500 m²/g. When the carbon powder has a specific surface area of 50 m²/g or more, it is relatively easy to improve the ratio of the electrocatalyst supported, and the output characteristics required for the catalyst layer 13 can be achieved with more certainty. On the other hand, when the carbon powder has a specific surface area of 1500 m²/g or less, coating with the polymer electrolyte is facilitated without excessively fine pores. Thus, the output characteristics required for the catalyst layer 13 can be achieved with more certainty. It is noted that the carbon powder further preferably has a specific surface area of 200 to 900 m²/g.

Polymer electrolytes having a sulfonic acid group, a carboxylic acid group, a phosphonic acid group, and a sulfonimide group as a cation-exchange group are preferable as the polymer electrolyte constituting the catalyst layer 13. It is noted that among these polymer electrolytes, the polymer electrolytes having a sulfonic acid group are particularly preferable from the viewpoint of hydrogen ion conductivity. This polymer electrolyte having a sulfonic acid group preferably has, for example, an ion exchange capacity of 0.5 to 1.5 meq/g. When the ion exchange capacity is 0.5 meq/g or more, the resistance value of the catalyst layer 13 can be prevented with more certainty from being increased during electrical power generation. On the other hand, when the ion exchange capacity is 1.5 meq/g or less, the moisture content of the catalyst layer 13 can be reduced to suppress swelling, and without obstructing pores, flooding can be prevented with more certainty. It is noted that the ion exchange capacity is further preferably 0.8 to 1.2 meq/g.

In addition, the polymer electrolyte constituting the catalyst layer 13 is a preferably a copolymer including a polymerization unit based on a perfluorovinyl compound represented by $CF_2=CF-(OCF_2CFX)_m-O_p-(CF_2)_n-SO_3H$ (wherein m represents an integer of 0 to 3, "n" represents an integer of 1 to 12, "p" represents 0 or 1, and "X" represents a fluorine atom or a trifluoromethyl group), and a polymerization unit based on tetrafluoroethylene.

Preferred examples of the perfluorovinyl compound include compounds represented by the following formulas (1) to (3). In the following formulas, however, "q" represents an integer of 1 to 8, "r" represents an integer of 1 to 8, and "t" represents an integer of 1 to 3.

$$CF_2=CFO(CF_2)_q-SO_3H \tag{1}$$

$$CF_2=CFOCF_2CF(CF_3)O(CF_2)_r-SO_3H \tag{2}$$

$$CF_2=CF(OCF_2CF(CF_3))_tO(CF_2)_2-SO_3H \tag{3}$$

It is noted that the polymer electrolytes mentioned above may be used as a constituent material for the polymer electrolyte membrane 1.

The catalyst layer 13 can be formed with the use of an ink for the formation of the catalyst layer, which includes at least conductive particles supporting the electrocatalyst thereon, the polymer electrolyte, and a dispersing medium. It is preferable to use, as the dispersing medium used for preparing the ink for the formation of the catalyst layer, a liquid containing an alcohol which is able to dissolve or disperse the polymer electrolyte (including a state in which some of the polymer electrolyte is dissolved, whereas the other thereof is dispersed without being dissolved). The dispersing medium preferably contains at least one of water, methanol, propanol, n-butyl alcohol, isobutyl alcohol, sec-butyl alcohol, and tert-butyl alcohol. These water and alcohols may be used singularly, or two or more thereof may be mixed. Linear chain structures having one OH group in a molecule are further preferable as the alcohol, among the linear chain structures, ethanol is particularly preferable. In addition, the alcohols also include ones having an ether linkage, such as ethylene glycol monomethyl ether.

In addition, the composition of the ink for the formation of the catalyst layer preferably has a solid content concentration of 0.1 to 20 mass %. When the solid content concentration is 0.1 mass % or more, the catalyst layer 13 with a desired thickness can be obtained without repeatedly spraying or applying the ink for the formation of the catalyst layer a number of times, in the case of forming the catalyst layer 13 by spraying or applying the ink for the formation of the catalyst layer. Thus, the production efficiency can be prevented from being decreased. On the other hand, when the solid content concentration is 20 mass % or less, the thickness of the catalyst layer 13 can be made substantially uniform, without excessively increasing the viscosity of the ink for the formation of the catalyst layer. It is noted that the solid content concentration is further preferably 1 to 10 mass %.

The ink for the formation of the catalyst layer can be prepared on the basis of conventionally known methods. For example, a method of using an agitator such as a homogenizer and a homomixer, or a method of using high-speed rotation such as using a high-speed rotating jet stream can be used to adjust the ink for the formation of the catalyst layer. In addition, a method of providing a shear force to a dispersing liquid by applying a high pressure to extrude the dispersing liquid from a narrow, such as high-pressure emulsification, can be used to adjust the ink for the formation of the catalyst layer.

As the method for forming the catalyst layer 13 with the use of the ink for the formation of the catalyst layer, conventionally known methods can be used such as, for example, a bar coater method and a spray method. More specifically, the catalyst layer 13 may be formed directly on the polymer electrolyte membrane 11 or the gas diffusion layer 14. Alternatively, the catalyst layer 13 may be formed on another support sheet, and transferred onto the polymer electrolyte membrane 11 or the gas diffusion layer 14.

Next, the gas diffusion layers 14 will be described.

The gas diffusion layer 14 comprises a gas-permeable and conductive porous member. As the porous member, conventionally known porous members can be used which are based on carbon fibers such as carbon paper, woven fabrics, or carbon felt. This porous member may have a conventionally known water-repellent conductive layer (a carbon layer, a layer containing a water repellent material and conducive carbon particles) provided on the surface in contact with the catalyst layer.

In addition, sheet-like and rubber-like porous members mainly containing conductive particles and a polymer resin can be also used as the gas diffusion layers 14. The thus configured porous member has the advantage that the reactive gas passage grooves are easily formed, as compared with the porous members based on the carbon fibers. On the other hand, the thus configured porous member has a feature of being likely to be deformed by a fastening pressure applied when the cell 1 is assembled.

Examples of materials for the conductive particles include carbon materials such as graphite, carbon black, and activated carbon. Examples of this carbon black include acetylene black (AB), furnace black, Ketjen Black, and Vulcan. Among the carbon materials, it is preferable to use acetylene black as a main constituent of carbon black from the viewpoints of small impurity content and high electrical conductivity. In addition, examples of the main constituent of the graphite include natural graphite and artificial graphite. Among these carbon materials, it is preferable to use artificial graphite as a main constituent of graphite from the viewpoint of a small amount of impurity.

Examples of the polymer resin include PTFE (polytetrafluoroethylene), FEP (tetrafluoroethylene-hexafluoropropylene copolymer), PVDF (polyvinilidene fluoride), ETFE (tetrafluoroethylene-ethylene copolymer), PCTFE (polychlorotrifluoroethylene), and PFA (tetrafluoroethylene-perfluoroalkylvinylether copolymer). Among these polymer resins, it is preferable to use PTFE as the polymer resin from the viewpoints of heat resistance, water repellency, and chemical resistance. Examples of the form of the raw material for PTFE include a dispersion and a powder form. Among the forms, it is preferable to adopt a dispersion as the form of the raw material for PTFE from the viewpoint of workability.

In addition, the gas diffusion layers 14 may contain minute amounts of surfactant and dispersing solvent for use in the production of the gas diffusion layers 14, besides the conductive particles and the polymer resin. Examples of the dispersing solvent include water, alcohols such as methanol and ethanol, and glycols such as ethylene glycol. Examples of the surfactant include non-ionic surfactants such as polyoxyethylenealkylether, and zwitterionic surfactants such as alkylamineoxide. The amounts of the dispersing solvent and surfactant for use in the production may be determined appropriately depending on the type of the conductive particles, the type of the polymer resin, the blend ratio therebetween. Further, in general, as the amounts of the dispersing solvent and surfactant are increased, the conductive particles and the polymer resin are likely to be dispersed uniformly, while the fluidity is increased, which may make it difficult to provide the gas diffusion layers as sheets.

In addition, the gas diffusion layers 14 may contain carbon fibers lighter in weight than the polymer resin contained in the gas diffusion layers 14. The carbon fibers have a reinforcement effect, and thus the increased blend ratio of the carbon fibers can produce high-strength gas diffusion layers. The carbon fibers contained in the gas diffusion layers 14 are effective particularly in the case of producing thin gas diffusion layers. For example, vapor grown carbon fibers (hereinafter, referred to as VGCF), milled fibers, cut fibers, chopped fibers can be used as the carbon fibers. The raw material for the milled fiber, cut fibers, or chopped fibers may be any of PAN, PITCH, and rayon materials. In addition, the respective fibers are preferably used by dispersing bundles of short fibers prepared by cutting or chopping the original yarns (long fiber filaments or short fiber stables).

In addition, the gas diffusion layer 14 has the reactive gas passage grooves 21 provided in the principal surface adjacent to the separator 20. The reactive gas passage grooves 21 can comprise, for example, serpentine passage grooves extending from upstream toward downstream in a serpentine configuration. As the serpentine passage grooves, two types are known: the type of a groove in a serpentine shape; and the type of more than one arranged groove in a serpentine shape. The respective grooves constituting the serpentine passage grooves may be formed at regular intervals, or formed at irregular intervals.

Next, the mesh sheets 15 will be described.

The mesh sheets 15 are sheets with a plurality of openings for reactive gas distribution. As long as the effect of reinforcing the gas diffusion layers 14 is achieved efficiently by the mesh sheets 15, the area ratio of the openings for reactive gas distribution is preferably higher to the entire mesh sheet, because the gas diffusivity of the gas diffusion layers is not disturbed. It is noted that while the mesh sheets 15 are used as the reinforcing members in this embodiment, the reinforcing members are not limited to the mesh sheets 15. For example, the reinforcing members may be any member with a plurality of openings for reactive gas distribution, which penetrate through the member in the thickness direction. For example, punching sheets may be used as the reinforcing members.

The material of the mesh sheets 15 is preferably a strong material such as metals or resins, in order to provide the reinforcement effect. The case of using a resin as the material for the mesh sheets 15 has the advantage of being easily molded along the reactive gas passage grooves 21. In addition, the material for the mesh sheets 15 preferably has electrical conductivity, so as not to increase the contact resistance. Furthermore, the material for the mesh sheets 15 is preferably a material which is less likely to be deteriorated under environments at high temperature, high humidity, and high electrical potential, and examples thereof are titanium, copper, stainless steel. Furthermore, the material for the mesh sheets 15 is preferably less likely to be softened in the operating temperature range of the fuel cell, and softened or cured in other temperature ranges. This case is convenient when the passage structure is formed.

Next, an example of a method for producing the gas diffusion layer 14 will be described which has the mesh sheet 15 provided on the principal surface adjacent to the separator 20. In this embodiment, the gas diffusion layers 14 will be described which comprises a porous member mainly containing conductive particles and a polymer resin.

First, the conductive particles, a polymer resin, dispersing solvent, and surfactant are subjected to kneading in an agitating and kneading machine.

Then, the kneaded material obtained is subjected to extrusion molding, and extended by applying a pressure into the form of a sheet with the use of a press machine.

Then, the sheeted kneaded material is subjected to calcining, and the surfactant and the dispersing solvent are removed from the kneaded material.

Then, the roll force and gap of the press machine are adjusted to extend the kneaded material again by applying a pressure, and thereby adjusting the porosity and thickness of the kneaded material.

Thus, the sheet-like gas diffusion layers 14 are produced which have a desired thickness. It is noted that the gas diffusion layers 14 have no reactive gas passage grooves 21 formed at this stage.

Figure 5A:
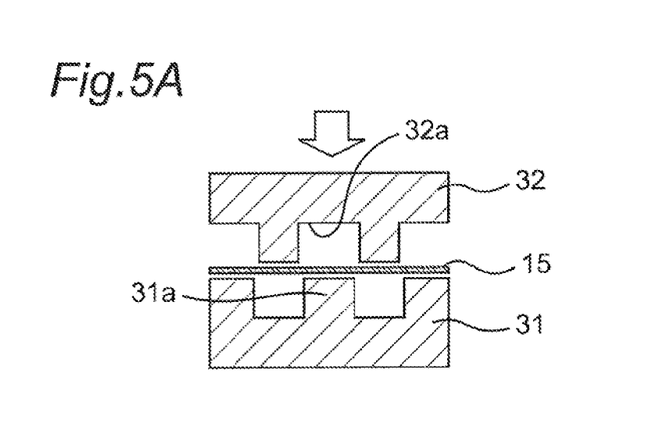
FIG. 5A is a cross-sectional view schematically illustrating a method for providing a mesh sheet on a principal surface of the gas diffusion layer included in the fuel cell of FIG. 1.
Figure 5B:
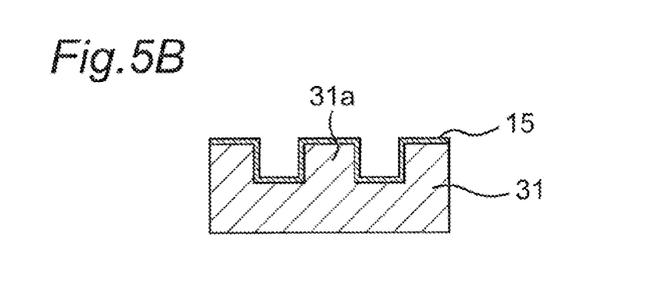
FIG. 5B is a cross-sectional view illustrating a step subsequent to FIG. 5A.

On the other hand, before or after the production of the sheet-like gas diffusion layers 14, with a planar mesh sheet 15 placed between a pair of molds containing a first mold 31 and a second mold 32 as shown in FIG. 5A, the first mold 31 and the second mold 32 are coupled. The first mold 31 has a convex section 31a corresponding to the reactive gas passage grooves 21. The second mold 32 includes a concave section 32a corresponding to the convex section 31a of the first mold 31. Thus, the mesh sheet 15 is molded into a concavo-convex shape as shown in FIG. 5B. This concavo-convex shape follows the shape of the principal surface on the separator 20 side of the gas diffusion layer 14 provided with the reactive gas passage grooves 21.

Figure 5C:
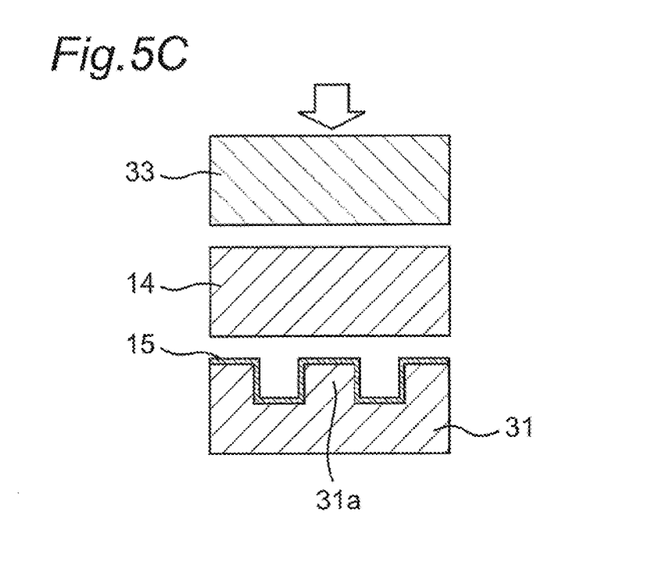
FIG. 5C is a cross-sectional view illustrating a step subsequent to FIG. 5B.

Then, as shown in FIG. 5C, a press machine 33 is placed above the mesh sheet 15 supported on the first mold 31, and the sheet-like gas diffusion layer 14 is placed between the mesh sheet 15 and the press machine 33.

Figure 5D:
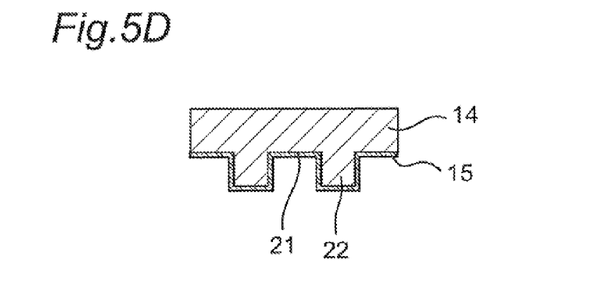
FIG. 5D is a cross-sectional view illustrating a step subsequent to FIG. 5C.

Then, the press machine 33 is used to push (press) the sheet-like gas diffusion layer 14 toward the mesh sheet 15 supported on the first mold 31. Thus, as shown in FIG. 5D, the principal surface of the gas diffusion layer 14 has the reactive gas passage grooves 21 formed therein, and has the mesh sheet 15 transferred thereto.

In the way described above, the gas diffusion layer 14 can be produced which has the mesh sheet 15 provided on the principal surface adjacent to the separator 20.

Next, the gaskets 16 will be described.

The gasket 16 is placed between the separator 20 and the polymer electrolyte membrane 11 so as to cover the side surfaces of the catalyst layer 13 and gas diffusion layer 14. The gas diffusion layers 14 preferably have outer edges impregnated with portions of the gaskets 16. Thus, the durability and strength can be improved against electrical power generation. Alternatively, in place of the gaskets 16, an annular gasket may be placed between the pair of separators 20, 20 so as to cover the side surfaces of the polymer electrolyte membrane 11, catalyst layer 13, and gas diffusion layer 14. Thus, the deterioration of the polymer electrolyte membrane 11 can be suppressed to improve the handling ability and the workability in mass production for the MEA 10.

Common thermoplastic resins or thermosetting resins can be used as the material of the gaskets 16. For example, silicon resins, epoxy resins, melamine resins, polyurethane resins, polyimide resins, acrylic resins, ABS resins, polypropylenes, liquid crystalline polymers, polyphenylenesulfide resins, polysulfones, glass-fiber reinforced resins can be used as the material of the gaskets 16.

Next, the separators 20 will be described. The separators 20 are intended to mechanically fix the MEA 10 for constituting the cell 1. In the case of stacking more than one cell 1 to constitute a fuel cell, the separators 20 electrically connect adjacent MEAs 10, 10 in series with each other.

Conventionally known separators can be used as the separators 20. For example, the separators 20 can be formed from metals, or gas-impermeable carbon which is carbon compressed for gas impermeability.

Further, a current collector (not shown) containing, for example, a metal plate of copper plated with gold may be attached to the surface of the separator 20, which is opposite to the surface opposed to the MEA 10. Thus, the current collection from the separator 20 can be achieved with more certainty.

In addition, a cooling water passage groove (not shown) through which cooling water passes may be provided on the surface of the separator 20, which is opposite to the surface opposed to the MEA 10. Thus, the temperature for each cell 1 can be controlled in the case of stacking more than one cell 1 to constitute a fuel cell. The cooling water passage groove may comprise, for example, a serpentine passage groove extending from upstream toward downstream in a serpentine configuration, as in the case of the reactive gas passage grooves 21 described above. Alternatively, the cooling water passage groove may comprise a plurality of substantially parallel linear grooves. In this case, the respective grooves are typically formed at regular intervals.

As described above, the fuel cell according to the first embodiment of the present invention has the mesh sheets 15 provided on the principal surfaces of the gas diffusion layers 14, and thus can suppress the deformation of the ribs 22 due to a fastening pressure applied when the pair of separators 20, 20 is attached to the MEA 10. Thus, the cross-sectional area of the reactive gas passage grooves 21 can be prevented from being reduced by the deformation of the ribs 22, and the pressure loss in the fuel cell can be prevented from being increased. More specifically, the reactive gases can be supplied sufficiently to the pair of electrode layers 12, 12 to improve the power generation performance.

In addition, according to the first embodiment of the present invention, the mesh sheet 15 is used as the reinforcing member, and the gas diffusivity can be thus prevented from being disturbed due to the mesh sheet 15, to achieve sufficient power generation performance.

<<Second Embodiment>>

Figure 6:
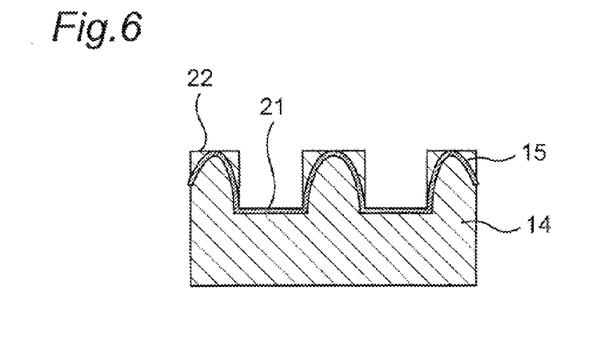
FIG. 6 is an enlarged cross-sectional view of a gas diffusion layer included in a fuel cell according to a second embodiment of the present invention.

FIG. 6 is an enlarged cross-sectional view of a gas diffusion layer included in a fuel cell according to a second embodiment of the present invention. The difference between the fuel cell according to this second embodiment and the fuel cell according to the first embodiment is that a mesh sheet 15 is provided so as to be buried into ribs 22 of a gas diffusion layer 14.

The thus configured fuel cell according to this second embodiment can also suppress the deformation of the ribs 22 due to the mesh sheet 15, and achieve the same effect as in the first embodiment described above.

If the mesh sheet 15 is excessively buried into the ribs 22 of the gas diffusion layer 14, there is a possibility that the deformation of the ribs 22 will not be suppressed. For this reason, the mesh sheet 15 is preferably molded, for example, with the use of a thermoplastic resin as the material of the mesh sheet 15, and with the temperatures of the first mold 31 and second mold 32 raised to a temperature of the glass transition temperature of the resin or more. The thus molded mesh sheet 15 is stretched a lot, and thus can be formed so as to be buried into only portions of the ribs 22 close to the surface thereof.

<<Third Embodiment>>

Figure 7:
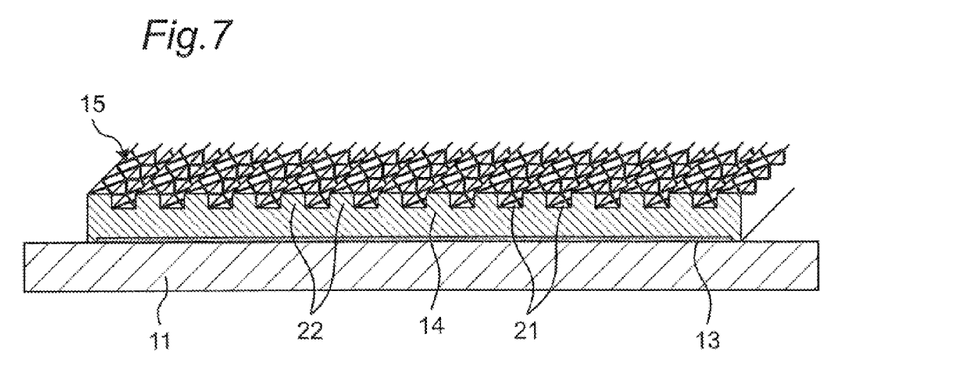
FIG. 7 is an enlarged perspective view illustrating a membrane-electrode assembly included in a fuel cell according to a third embodiment of the present invention, and a diagram illustrating a section of the membrane-electrode assembly in cross-section.

FIG. 7 is an enlarged perspective view illustrating an MEA included in a fuel cell according to a third embodiment of the present invention, and a diagram illustrating a section of the MEA in cross-section. The difference between the fuel cell according to this third embodiment and the fuel cell according to the first embodiment is that respective wire rods constituting a mesh sheet 15 are arranged obliquely to the direction of extending reactive gas passage grooves 21 (the convex section 31a of the first mold 31).

Figure 8A:
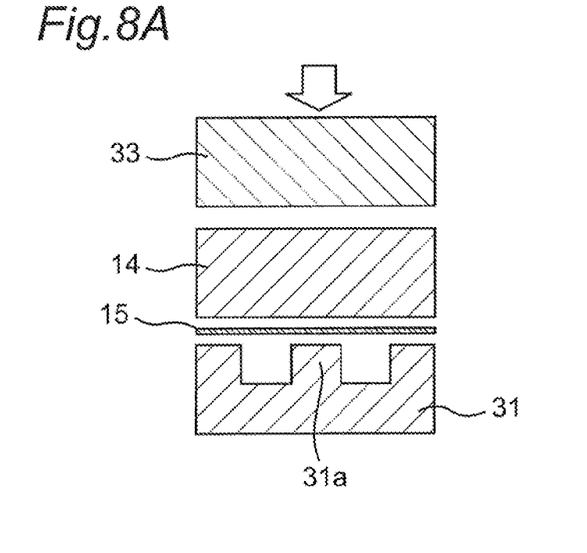
FIG. 8A is a cross-sectional view schematically illustrating a method for providing a mesh sheet on a principal surface of a gas diffusion layer included in the fuel cell of FIG. 7.
Figure 8B:
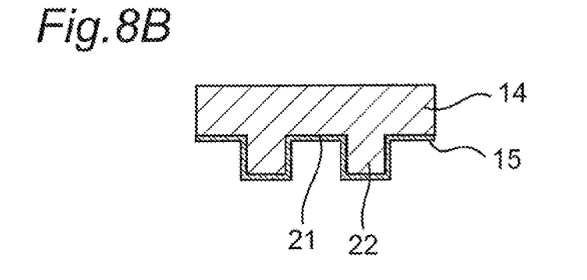
FIG. 8B is a cross-sectional view illustrating a step subsequent to FIG. 8A.

In the case of this structure, when the press machine 33 is used to provide the mesh sheet 15 on the principal surface of the gas diffusion layer 14 as shown in FIG. 5C, the mesh of the mesh sheet 15 extends in a direction perpendicular to the direction of extending the reactive gas passage grooves 21. Thus, the mesh sheet 15 can be formed in portions of the ribs 22 closer to the surface thereof. In addition, this structure can eliminate the need to mold the mesh sheet 15 into a concavo-convex shape in advance as in the first embodiment. More specifically, as shown in FIG. 8A, with the sheet-like gas diffusion layer 14 and planar mesh sheet 15 placed between the first mold 31 and the press machine 33, the press machine 33 is used to push (press) the sheet-like gas diffusion layer 14 and the mesh sheet 15 toward the first mold 31. Thus, as shown in FIG. 8B, the reactive gas passage grooves 21 can be formed in the principal surface of the gas diffusion layer 14, and the mesh sheet 15 can be transferred to the principal surface.

Even when the mesh sheet 15 is molded, for example, with the use of a thermoplastic resin as the material of the mesh sheet 15, and with the temperatures of the first mold 31 and second mold 32 raised to a temperature of the glass transition temperature of the resin or more, the respective wire rods constituting a mesh sheet 15 are stretched, and the mesh of the mesh sheet 15 thus extends in a direction perpendicular to the direction of extending the reactive gas passage grooves 21. Therefore, this case can also eliminate the need to mold the mesh sheet 15 into a concavo-convex shape in advance as in the first embodiment.

<<Fourth Embodiment>>

Figure 9:
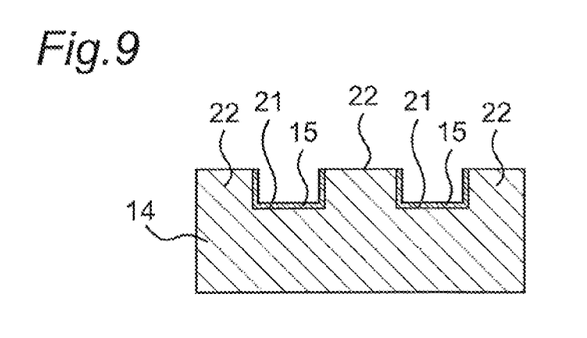
FIG. 9 is an enlarged cross-sectional view of a gas diffusion layer included in a fuel cell according to a fourth embodiment of the present invention.

FIG. 9 is an enlarged cross-sectional view of a gas diffusion layer included in a fuel cell according to a fourth embodiment of the present invention. The difference between the fuel cell according to this fourth embodiment and the fuel cell according to the first embodiment is that no mesh sheet 15 is provided on some or all of ribs 22. In other words, in the fuel cell according to this fourth embodiment, the mesh sheet 15 located on the upper surface of the ribs 22 is partially or entirely removed purposely.

The thus configured fuel cell according to this fourth embodiment can further prevent, due to the mesh sheet 15, the gas diffusivity from being disturbed, to achieve sufficient power generation performance. In addition, the mesh sheet 15 is not provided on some or all of the ribs 22. Thus, even when the mesh sheet 15 comprises a non-conductive member, the mesh sheet 15 can prevent electrical conduction from being disturbed, and thereby achieving sufficient power generation performance.

The gas diffusion layer 14 with the mesh sheet 15 according to this fourth embodiment can be produced, for example, in the following way.

First, the sheet-like gas diffusion layers 14 are produced in the same way as in the first embodiment described above, and a plurality of linear slits 15a is formed in the planar mesh sheet 15 at intervals corresponding to the arrangement pitch of the ribs 22.

Figure 10A:
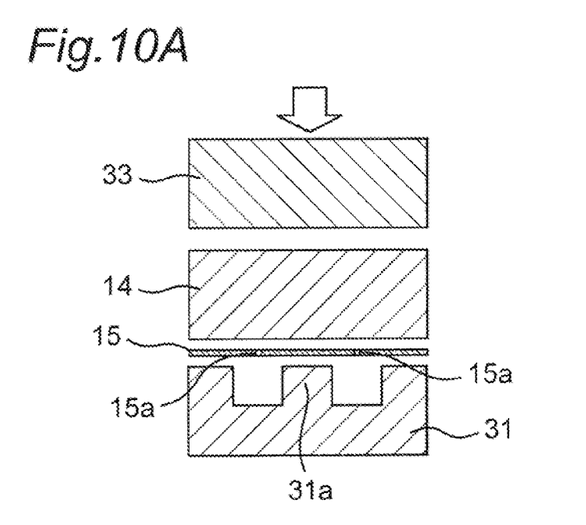
FIG. 10A is a cross-sectional view schematically illustrating a method for providing a mesh sheet on a principal surface of the gas diffusion layer included in the fuel cell of FIG. 9.

Then, as shown in FIG. 10A, the sheet-like gas diffusion layer 14 and the planar mesh sheet 15 are placed between the first mold 31 and the press machine 33. In this case, the mesh sheet 15 is placed so that each slit 15a is located in the central portion of the corresponding rib 22.

Figure 10B:
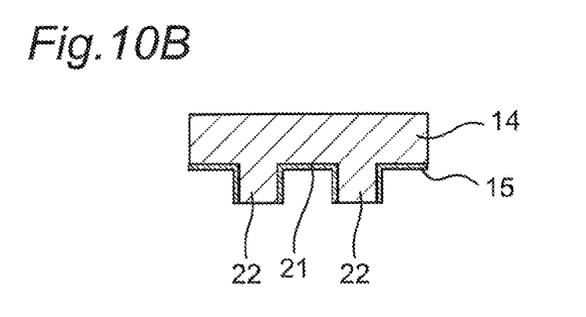
FIG. 10B is a cross-sectional view illustrating a step subsequent to FIG. 10A.

Then, the press machine 33 is used to push (press) the sheet-like gas diffusion layer 14 and the mesh sheet 15 toward the first mold 31. Thus, the mesh sheet 15 existing between the slits 15a, 15a adjacent to each other is drawn into reactive gas passage grooves 21 to form the gas diffusion layer 14 with the mesh sheet 15 shown in FIG. 10B.

It is noted that the present invention is not to be considered limited to the embodiments described above, and can be implemented in other various embodiments.

Further, by properly combining the arbitrary embodiments of the aforementioned various embodiments, the effects possessed by the embodiments can be produced.

Industrial Applicability

The gas diffusion layer for a fuel cell and manufacturing method thereof, membrane electrode assembly, as well as fuel cell of the present invention can suppress the deformation of the gas diffusion layer due to a fastening pressure to improve the power generation performance, and thus prove to be useful for, for example, fuel cells which are used as driving sources for moving vehicles such as automobiles, distributed power generation systems, household cogeneration systems.

Although the present invention has fully described in connection with the preferred embodiments thereof with reference to the accompanying drawings, it is noted that various changes and modifications are apparent to those skilled in the art. Such changes and modifications are to be understood as included within the scope of the present invention as defined by the appended claims unless they depart therefrom.

The disclosure of Japanese Patent Application No. 2009-203432 filed on Sep. 3, 2009 including specification, drawing and claims are incorporated herein by reference in its entirety.

The invention claimed is:

1. A gas diffusion layer for a fuel cell comprising a reinforcing member provided along a reactive gas passage groove for distributing a reactive gas, the groove being formed in one principal surface of the gas diffusion layer, wherein the gas diffusion layer comprises a porous member mainly containing conductive particles and a polymer resin, the porous member having a structure supported by the conductive particles and the polymer resin without using carbon fiber paper, and wherein the reinforcing member is a mesh sheet-like member made of metal or resin, and comprises a plurality of openings for reactive gas distribution.

2. The gas diffusion layer according to claim 1, wherein the gas diffusion layer comprises ribs arranged adjacent to the reactive gas passage groove so as to be separated from each other by the reactive gas passage groove, the reinforcing member reinforces the ribs, and the reinforcing member is provided along the reactive gas passage groove.

3. The gas diffusion layer according to claim 1, wherein the reinforcing member is a mesh sheet.

4. The gas diffusion layer according to claim 1, wherein the reinforcing member has a concavo-convex shape corresponding to the shape of the principal surface of the gas diffusion layer, and the reinforcing member is provided along the principal surface.

5. The gas diffusion layer according to claim 1, wherein the reinforcing member is provided only on a surface of the reactive gas passage groove.

6. A membrane electrode assembly comprising:
a polymer electrolyte membrane;
a pair of catalyst layers opposed to each other with the polymer electrolyte membrane interposed between the catalyst layers; and
a pair of gas diffusion layers opposed to each other with the polymer electrolyte membrane and the pair of catalyst layers interposed between the gas diffusion layers,
wherein at least one of the pair of gas diffusion layers is the gas diffusion layer for a fuel cell according to claim 1.

7. A fuel cell comprising:
a polymer electrolyte membrane;
a pair of catalyst layers opposed to each other with the polymer electrolyte membrane interposed between the catalyst layers;
a pair of gas diffusion layers opposed to each other with the polymer electrolyte membrane and the pair of catalyst layers interposed between the gas diffusion layers; and
a pair of separators opposed to each other with the polymer electrolyte membrane, the pair of catalyst layers, and the gas diffusion layers interposed between the separators,
wherein at least one of the pair of gas diffusion layers is the gas diffusion layer for a fuel cell according to claim 1.

8. A manufacturing method of a gas diffusion layer for a fuel cell, the method comprising:
preparing a porous member mainly containing conductive particles and a polymer resin, the porous member obtained by applying a pressure to extend a kneaded material containing the conductive particles and the polymer resin into a form of a sheet with use of a press machine, and firing the sheeted kneaded material, the porous member having a structure supported by the conductive particles and the polymer resin without using carbon fiber paper;
placing a reinforcing member and the porous member between a mold and a press machine, the mold having a convex section corresponding to a shape of a reactive gas passage groove; and
moving the press machine toward the mold to push the porous member and the reinforcing member against the mold, thereby forming the reactive gas passage groove in one principal surface of the porous member, and forming the reinforcing member along the reactive gas passage groove,
wherein a mesh sheet-like member made of metal or resin and comprising a plurality of openings for reactive gas distribution is used as the reinforcing member.

9. The manufacturing method according to claim 8, wherein a mesh sheet is used as the reinforcing member.

10. The manufacturing method according to claim 9, wherein, when the mesh sheet is placed between the mold having the convex section and the press machine, the mesh sheet is placed so that each wire rod constituting the mesh sheet is oblique to a direction of extending the convex section.

11. The manufacturing method according to claim 8, wherein before placing the reinforcing member between the mold having the convex section and the press machine, the reinforcing member is placed between the mold having the convex section and a mold having a concave section corresponding to the convex section, and the molds are coupled to form the reinforcing member in advance, so as to match a shape of the mold having the convex section.

12. The manufacturing method according to claim 11, wherein the mold having the convex section and the mold having the concave section are coupled with the use of a thermoplastic resin as a material for the reinforcing member, and with temperatures of the molds raised to a temperature of a glass transition temperature of the thermoplastic resin or more, thereby forming the reinforcing member in advance so as to match a shape of the mold having the convex section.

13. The manufacturing method according to claim 8, wherein the sheet-like member is provided with a plurality of linear slits at intervals corresponding to an arrangement pitch of ribs, the ribs being adjacent to the reactive gas passage groove so as to be separated from each other by the reactive gas passage groove.

* * * * *